Nov. 1, 1960
R. E. SCOTT
2,958,108
FASTENER AND ASSEMBLY
Filed Aug. 9, 1956
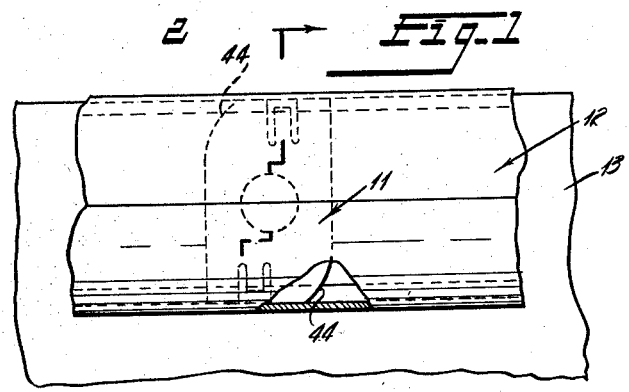
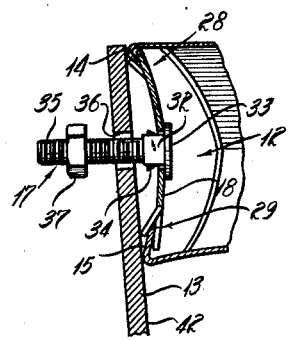
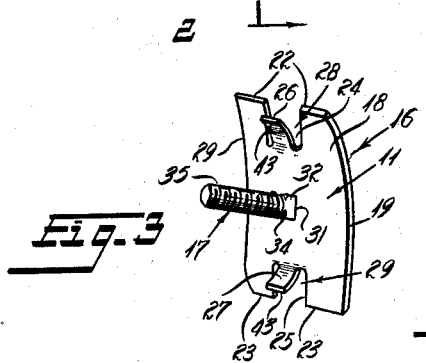
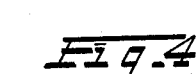
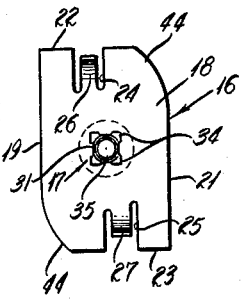
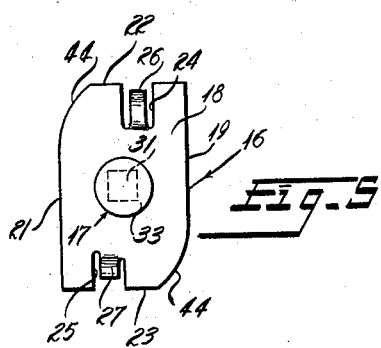
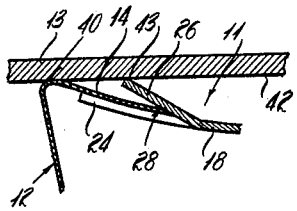
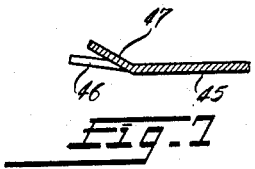
INVENTOR
ROBERT E. SCOTT
BY Strauch, Nolan & Neale
ATTORNEYS

United States Patent Office 2,958,108
Patented Nov. 1, 1960

2,958,108

FASTENER AND ASSEMBLY

Robert E. Scott, Bloomfield Township, Oakland County, Mich., assignor to Gagnier Fibre Products Company, Oak Park, Mich., a corporation of Michigan Filed Aug. 9, 1956, Ser. No. 603,031

9 Claims. (Cl. 24—73)

This invention relates to fasteners and special assemblies incorporating them and particularly to fasteners for attaching molding strips and the like to panels.

While many such fasteners have heretofore been proposed, the present invention provides a novel readily manufactured and assembled structure that positively holds the molding strip in place in a manner superior to those heretofore suggested.

It is therefore the major object of this invention to provide a novel fastener and assembly thereof with a molding strip wherein the fastener is specifically formed to positively trap opposed molding strip flanges.

A further object of the invention is to provide a novel fastener wherein a rigid head structure is formed with diverging jaw structure on opposite sides for trapping associated molding flanges.

It is a further object to provide a novel fastener of this type wherein the jaws may be so inclined relative to the head as to provide and maintain a given shape to a flexible molding or like structure associated therewith.

A further object of the invention is to provide a novel fastener wherein an attachment stud non-rotatably projects from a rigid head plate having opposed jaws between which opposed molding strip flanges are gripped.

Further objects of the invention will appear as the description proceeds in connection with the appended claims and the annexed drawings wherein;

Figure 1 is a fragmentary elevation partly broken away and in section showing a molding strip mounted on an automobile side panel according to a preferred embodiment of the invention;

Figure 2 is a section on line 2—2 of Figure 1;

Figure 3 is a generally perspective view of the fastener of Figure 1;

Figures 4 and 5 are bottom and top views respectively of the fastener of Figure 3;

Figure 6 is an enlarged fragmentary view in section showing how the fastener head traps each flange; and Figure 7 shows an embodiment wherein both sides of the jaws are inclined to the plate, this being useful to shape a flexible molding strip in assembly.

The fastener assembly 11 of Figure 3 is shown in Figures 1 and 2 as assembled with a narrow sheet metal molding strip 12 for attaching it to a relatively rigid automobile side wall 13.

Molding strip 12 is of the usual type presenting an arcuate or otherwise ornamental outer surface and having on opposite edges narrow inturned integral flanges 14 and 15. As shown best in Figure 6 these flanges are usually inclined at about 90° or sometimes slightly less to the adjacent wall of the molding.

Fastener 11 consists essentially of a rigid head 16 and a rigid stud 17. Head 16 is a stiff generally rectangular metal plate 18 which is in most embodiments of slightly outwardly convex structure with two flat parallel side edges 19 and 21 and two flat parallel end edges 22 and 23. Two edge recesses 24 and 25 are formed in plate 18 opening into the respective end edges, and from the bottom of these recesses integrally project two rigid lips 26 and 27 which diverge at about the same acute angle with respect to the head plate 18. This provides plate 18 with integral diverging jaws 28 and 29 at opposite ends and as shown in Figure 2 these jaws trap the opposed molding flanges 14 and 15 in the assembly.

Plate 18 is formed centrally with a non-circular, here square, hole 31, and the stud 17 is formed with a corresponding non-circular shank section 32 by which the stud 17 is non-rotatably mounted on plate 18. At the convex side of plate 18, stud 17 is formed with a head 33 larger than hole 32, and on the other side a series of lateral projections 34 are staked out of the metal of stud section 32 so that the stud 17 is fixed against any appreciable rotation or axial shift on plate 18. Stud 17 is threaded for most of its length at 35 and is adapted to project through openings 36 of the wall 13 to receive a nut 37 or like securing means.

In use the parts 17 and 18 are made into a unitary fastener assembly and a series of these fasteners are slidably inserted into an open end of the length of molding 12, the number of fasteners corresponding to the number of holes 36. The plate 18 frictionally slides along and will maintain a given location along the channels formed by flanges 14 and 15. In this assembly, as shown in Figure 2, the jaws 28 and 29 embrace or trap the opposed molding flanges 14 and 15. As shown in Figure 6 the inclined lip 26 which forms one side of jaw 28 extends between the flange 14 and wall 13 while the other side of jaw 28 which is a straight extension of plate 18 extends over the flange 14 within the confines of the molding, and there is a tight frictional fit of the molding within the jaws which nevertheless permits the fastener to be pushed along the molding to proper location.

As shown in Figure 6 in a preferred form of assembly the flange 14 is bent to less than 90° with the associated wall of the molding so that the opposite side edge surfaces 40 of the molding strip 12 are in about the same plane as lips 26 and 27. Thus when the stud is thrust through opening 36 and nut 37 pulled tight the entire fastener and associated molding assembly is pulled against wall 13 and in the form shown in Figure 6 molding surfaces 40 will be tight against the wall surfaces. As plate 18 is drawn tight against wall 13, lips 26 and 27 encounter the wall surface 42 and a twofold locking action is produced as the lips 26 and 27 bend back slightly to narrow the jaws 28 and 29 and thereby more tightly grip the molding against endwise shift, and at the same time the sharp tips 43 of lips 26 and 27 bite into and clench with the wall surface 42 to resist loosening of the fastener due to vibration and the like.

For ease in inserting heads 18 into the flange channels at least the opposite diagonal corners of plate 18 are rounded as shown at 44 so that when a fastener is inserted as from the left in Figure 1 it may be tilted a few degrees to first engage surface 44 in the molding channel and line up the flanges 14 and 15 with jaws 28 and 29 and then rock the fastener to the Figure 1 position when fully inserted. By providing rounded cam corners 44 at two diagonally opposite corners of plate 18 the fastener is reversible in that respect and no special orientation is needed.

While plate 18 has been described as slightly arcuate it may be made straight without departing from the spirit of the invention, and moreover jaws 28 and 29 may be inclined at any suitable angle to the plate 18 to fit with correspondingly inclined molding flanges. As the fastener is drawn tight the flanged side edges of the molding are drawn against the support wall and since the metal of the molding is thinner than that of plate 18, the molding is thus deformed to a shape that is maintained in the assembly.

Moreover by suitably shaping head 18 and trapping the side flanges 14 and 15 of a flexible molding strip between opposite jaws 28 and 29 of desired inclination it is possible to shape the molding strip to desired condition and maintain it there during assembly. Figure 7 shows an embodiment wherein the plate 45 which is otherwise shaped like plate 18 is flat rather than arcuate and the jaw side extension 46 which correspond to the plate portions beside the edge recesses in Figure 4 and the lips 47 which correspond to lips 26, 27 of Figure 4 are both inclined with respect to the plate.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fastener comprising a substantially rigid head structure consisting essentially of a stiff metal plate having at two opposite edges integral inclined substantially straight lips extending at acute angles to the plate to thereby provide opposed outwardly open molding strip trapping jaws, and an attachment stud non-rotatably secured to said plate intermediate said jaws.

2. The fastener defined in claim 1, wherein said plate is substantially concavo-convex and said stud projects therefrom opposite the convex surface.

3. The fastener defined in claim 1, wherein said lips are relatively narrow portions formed by material bent out of intermediate edge recesses formed in the plate.

4. The fastener defined in claim 1, wherein said plate is formed with a non-circular recess, said stud is formed with a corresponding non-circular shank portion within said recess, corresponding formations are provided on the stud and plate to prevent material relative shift of the stud in the recess in the direction of its axis and said stud is threaded outwardly of said shank portion.

5. In a molding strip fastener composed of a substantially rigid head structure and a rigid attachment stud projecting at an angle therefrom, said head structure being an integral plate of stiff metal and having at two opposite edges thereof outwardly open molding strip flange gripping jaws, each jaw comprising two spaced portions of the plate on one side and on the other side a relatively inclined straight lip projecting integrally from the plate at an acute angle intermediate said spaced portions, and an attachment stud non-rotatably secured to said plate.

6. In the fastener defined in claim 5, one of said jaw sides being an unbent continuation of said plate.

7. In the fastener defined in claim 5, both of said jaw sides being inclined at acute but different angles to the plate.

8. A fastener comprising a rigid head structure consisting essentially of a stiff metal plate, means at two opposed edges of said plate providing outwardly open molding strip embracing jaws each comprising relatively inclined integral portions of said plate, at least one side of each of said jaws comprising a bendable cut-out edge lip extending at an acute angle to the adjacent portion of the plate and an attachment stud non-rotatably secured to said plate intermediate said jaws.

9. A fastener comprising a rigid head structure consisting essentially of a stiff plate member, means at two opposed edges of said plate member providing outwardly open molding strip embracing jaws each comprising relatively inclined integral portions of the plate member, at least one side of each of said jaws comprising a bendable integral edge lip extending at an acute angle to the adjacent portion of the plate member, and an attachment stud non-rotatably connected to the plate member intermediate the jaws and projecting at substantially right angles to said plate member.

References Cited in the file of this patent

UNITED STATES PATENTS

| | | |
|---|---|---|
| 890,285 | Krantz | June 9, 1908 |
| 2,040,750 | Long | May 12, 1936 |
| 2,278,627 | Wernig | Apr. 7, 1942 |
| 2,318,840 | Del Camp | May 11, 1943 |
| 2,531,351 | Churchill | Nov. 21, 1950 |
| 2,531,352 | Churchill | Nov. 21, 1950 |

FOREIGN PATENTS

| | | |
|---|---|---|
| 974,654 | France | Oct. 4, 1950 |